United States Patent [19]

Thayer et al.

[11] Patent Number: 4,989,738
[45] Date of Patent: Feb. 5, 1991

[54] PLASTIC BOTTLE WITH REINFORCED CONCAVE BOTTOM

[75] Inventors: Robert S. Thayer, Pittsfield, Mass.; Richard D. Clark, Sunbury, Ohio

[73] Assignees: General Electric Company, Pittsfield, Mass.; Liqui-Box Corporation, Worthington, Ohio

[21] Appl. No.: 420,884

[22] Filed: Oct. 13, 1989

[51] Int. Cl.$^5$ .......................... B65D 1/44; B65D 1/02
[52] U.S. Cl. ..................... 215/1 C; 220/606; 220/608
[58] Field of Search ......................... 215/1 C; 220/69 (U.S. only), 70, 604, 606, 608, 609, 633, 635 (U.S. only); 428/36.92

[56] References Cited

U.S. PATENT DOCUMENTS

| | | | |
|---|---|---|---|
| H469 | 5/1988 | Deak | 215/1 C X |
| 3,029,963 | 4/1962 | Evers | 215/1 C |
| 3,403,804 | 10/1968 | Colombo | 215/1 C X |
| 3,598,270 | 8/1971 | Adomaitis | 215/1 C |
| 3,718,229 | 2/1973 | Wyeth et al. | 215/1 C |
| 3,722,726 | 3/1973 | Carmichael et al. | 215/1 C |
| 3,757,978 | 9/1973 | Gilbert | 215/1 C |
| 3,811,588 | 5/1974 | Vermeerbergen et al. | 215/1 C |
| 3,843,005 | 10/1974 | Uhlig | 215/1 C |
| 3,871,541 | 3/1975 | Adomaitis | 215/1 C |
| 3,881,621 | 5/1975 | Adomaitis | 215/1 C |
| 3,949,033 | 4/1976 | Uhlig | 264/89 |
| 3,956,441 | 5/1976 | Uhlig | 264/89 |
| 4,024,975 | 5/1975 | Uhlig | 215/1 C |
| 4,108,324 | 8/1978 | Krishnakumar et al. | 215/1 C |
| 4,151,249 | 4/1979 | Lee | 215/1 C X |
| 4,170,622 | 10/1979 | Uhlig | 215/1 C X |
| 4,247,012 | 1/1981 | Alberghini | 215/1 C |
| 4,261,948 | 4/1981 | Krishnakumar et al. | 264/532 |
| 4,334,627 | 6/1982 | Krishnakumar et al. | 215/1 C |
| 4,335,821 | 6/1982 | Collette et al. | 215/1 C X |
| 4,342,398 | 8/1982 | Chang | 215/1 C |
| 4,502,607 | 3/1985 | Szajna | 215/1 C X |
| 4,513,037 | 4/1985 | Collins | 428/35 |
| 4,525,401 | 6/1985 | Pocock et al. | 215/1 C X |
| 4,605,576 | 8/1986 | Jabarin | 428/35 |
| 4,610,366 | 9/1986 | Estes et al. | 215/1 C |
| 4,755,404 | 7/1988 | Collette | 220/70 X |
| 4,759,454 | 7/1988 | Nowicki et al. | 220/70 |
| 4,800,129 | 1/1989 | Deak | 428/474.4 |

FOREIGN PATENT DOCUMENTS 617278  3/1961  Canada ............................. 220/70

*Primary Examiner*—Sue A. Weaver
*Attorney, Agent, or Firm*—Bernard, Rothwell & Brown

[57] ABSTRACT

A blow molded plastic bottle has a reinforced plastic bottom with a concave central portion and a bottom rim portion. A solid depending rib, formed at the pinch off seam, extends across the concave portion, and depending hollow ribs, formed in the concave portion at ninety degress to the solid rib, extend radially to the bottom rim portion. The hollow rims effectively reduce the depth of the bottom rim intermediate the seam junctions to reduce bulging of the concave base thereby preventing instability.

6 Claims, 2 Drawing Sheets

PLASTIC BOTTLE WITH REINFORCED CONCAVE BOTTOM

TECHNICAL FIELD

The invention relates to plastic bottles formed with concave bottoms which are reinforced to resist bulging from the pressure of contents of the bottles.

BACKGROUND ART

Plastic bottles are formed with concave bottoms in order to form an outer bottom rim by which the bottles can stand upright on a shelf. The plastic material in the bottles is made as thin as possible in order to minimize the quantity of plastic material so that the bottles can be produced at a cost which is competitive with other commercially produced bottles. Flat bottoms made of such thin plastic materials would bulge from the pressure of carbonated beverages and render bottles with such bottoms unstable when placed upright on a shelf causing the bottles to rock or fall over. Bottoms with concave center portions offer an improvement in shelf stability of the bottles, but the competition to reduce cost by using less material in the bottle has lead to many different types of reinforcements for concave bottoms to avoid bulging of the thinner concave bottoms.

One example of a prior art reinforced concave bottom is illustrated in U.S. Pat. No. 4,502,607 which shows a depending solid rib formed along the mold parting line at the pinched off end of a preform. This rib offers substantial support for the concave portion of the bottom to prevent bulging of the concave portion. However, bottles formed with such depending solid ribs are subject to standing instability due to bulging from internal bottle pressures in bottom rim portions which are disposed on opposite sides of the solid ribs.

Another example of prior art bottom reinforcement is shown in U.S. Pat. No. 4,108,324 which has eight radially spaced hollow convex ribs extending from the concave portion to the rim portion of the bottom. While these hollow convex ribs result in increased resistance to bulging compared to a non-reinforced concave bottom, they do not produce the degree of bulge resistance that a solid rib formed at the pinch off seam can produce.

SUMMARY OF THE INVENTION

The invention is summarized in a reinforced concave bottom for a plastic bottle having the combination of a depending solid rib extending across the concave portion and being joined at opposite ends to opposite portions of the rim portion of the bottom, and a pair of depending hollow ribs formed in the concave portion on respective opposite sides of the solid rib, the hollow ribs extending radially in periphery of the concave portion and being joined with the bottom rim portion intermediate the junctions of the solid rib with the bottom rim portion.

It has been found that instability in a concave bottom of a plastic bottle with a depending solid rib formed at the pinch off seam can be overcome by forming hollow depending ribs on opposite sides of the solid rib and extending to the bottom rim portion. The hollow ribs joining the bottom rim reduce the amount of stretch during blow molding in the plastic material in the bottom rim intermediate the junctions with the solid rib. This results in increased thickness at such intermediate portions which in turn enables reduced material usage and substantial cost savings.

Other objects, advantages and features of the invention will be apparent from the following description of the preferred embodiment taken in conjunction with the accompanying drawings.

DESCRIPTION OF THE PREFERRED EMBODIMENT

Figure 1:
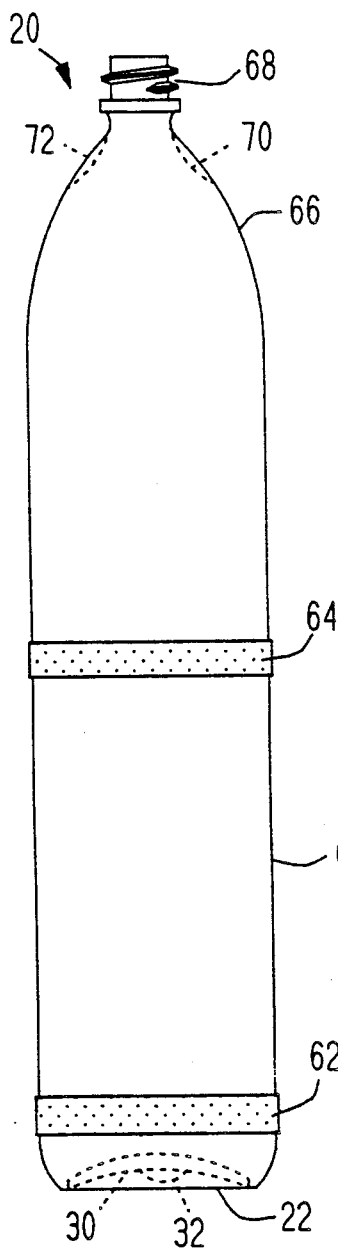
FIG. 1 is an elevation view of a bottle with concave bottom reinforcements shown diagrammatically by hidden lines.
Figure 2:
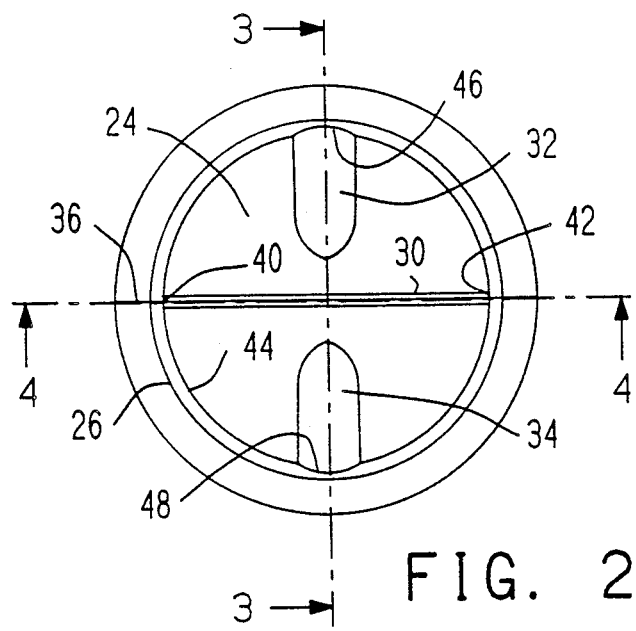
FIG. 2 is a bottom view of the bottle of FIG. 1.
Figure 3:
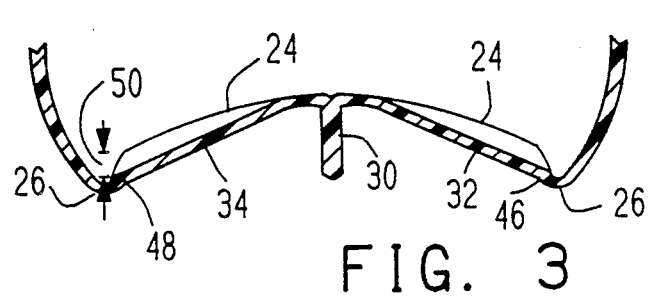
FIG. 3 is a section view of a broken away bottom portion of the bottle taken at line 3—3 of FIG. 2.
Figure 4:
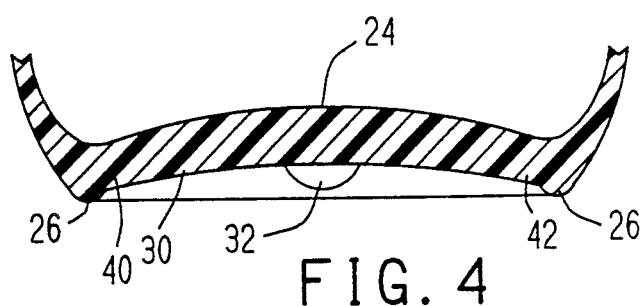
FIG. 4 is a section view of a broken away bottom portion of the bottle taken at line 4—4 of FIG. 2.

As shown in FIGS. 1, 2, 3 and 4, one embodiment of the invention is a plastic bottle 20 having a bottom 22 with a concave portion 24 and a rim portion 26 which surrounds and extends downward from the concave portion. Reinforcements for the bottom include a solid depending rib 30 and two hollow depending ribs 32 and 34. The solid rib 30 is formed by a sealed seam at the pinch off juncture along the mold seam line 36 of the bottle and extends across the concave portion 24 with its opposite ends 40 and 42 being joined with the rim portion 26. The hollow ribs 32 and 34 are formed by downwardly deflected portions of the concave portion 24 on opposite sides of the solid rib 30, and extend radially over a peripheral portion of the concavity 24 to the bottom rim 26 where the ribs 32 and 34 join with the inside wall 44 of the bottom rim intermediate to the junctions of the bottom rim with the solid rib ends 40 and 42. At regions 46 and 48 where the hollow ribs 32 and 34 join the inner wall 44 of the bottom rim, the height of the wall 44 is substantially reduced as can be seen be the dimension 50 in FIG. 3. This height reduction substantially reduces the amount that the material must stretch in this region to result in increased thickness and resistance against bulging from internal bottle pressure. In the illustrated example of the preferred embodiment, the hollow ribs 32 and 34 are located ninety degrees or perpendicular to the solid rib 30. The ribs 30, 32 and 34 have depths selected to give substantial reinforcement while avoiding extending below the bottom rim 26 under conditions of normal internal bottle pressures.

The bottle 20 has a tubular wall 60 with spaced raised annular bands 62 and 64. The outer surfaces of the bands can be roughened or knurled to enable more sure gripping of the bottle. The upper portion of the bottle is defined by a curved tapered extension 66 of the wall 60 with a threaded nipple 68 formed on top. Pinch off junctions 70 and 72 are formed in the upper portion of the bottle.

Figure 5:
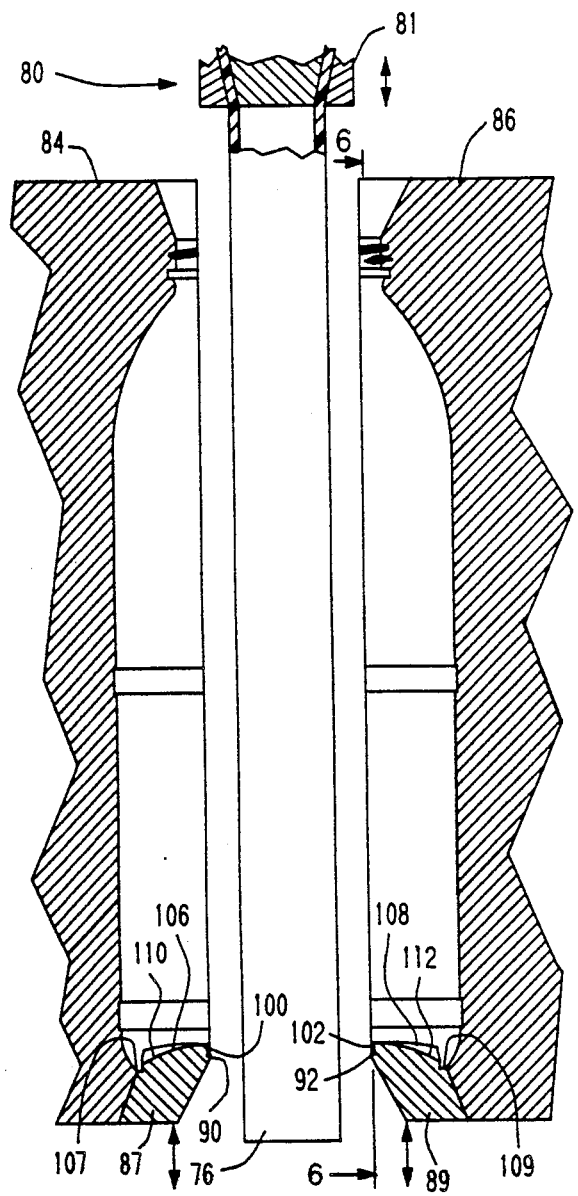
FIG. 5 is a section view of a broken away portion of a blow molding apparatus for forming the bottle of FIG. 1.
Figure 6:
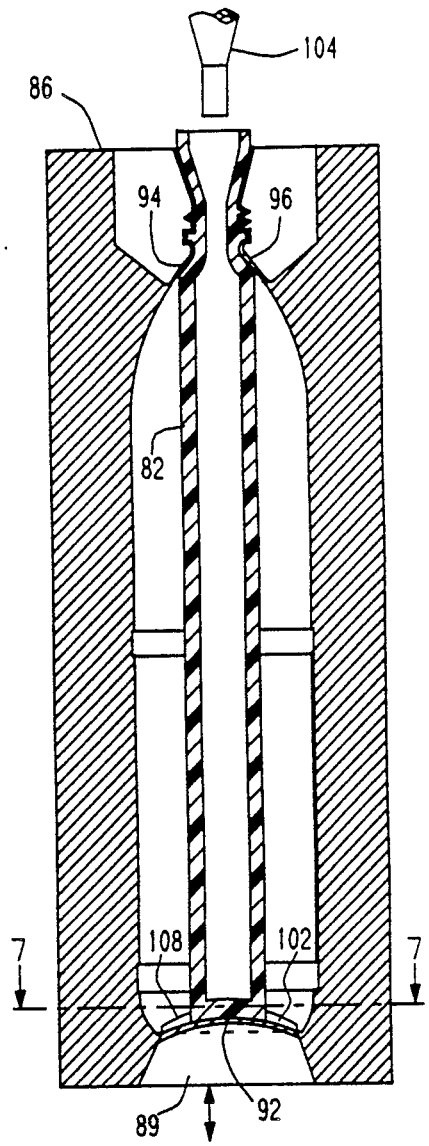
FIG. 6 is a section view of a mold half taken at line 6—6 in FIG. 5 but at a later time after the preform and mold have been moved to a blowing station.
Figure 7:
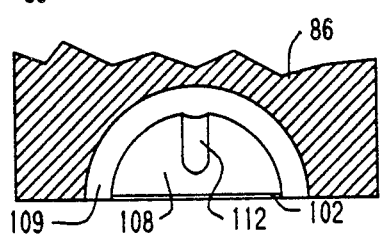
FIG. 7 is a section view taken at line 7—7 in FIG. 6.

The bottle is formed by conventional blow molding, for example, as shown in FIGS. 5, 6 and 7. A tubular segment of plastic material 76 is extruded by extrusion apparatus indicated generally at 80. An outer ring member 81 of the extrusion apparatus is moved up and down in a conventional manner to vary the thickness of the wall of the tubular segment 76 in accordance with conventional practice. Generally the bottom portion of the tube 76 will have a thicker wall than the upper portion.

A bottle preform 82 is made by closing mold halves 84 and 86, which have respective movable inserts 87 and 89, on the hot tubular segment 76 and severing the segment from the extruder 80 with a hot knife (not shown). During closing of the mold halves, a portion of the bottom end of the tube 76 is pinched off by die pinch off members 90 and 92, and upper side portions of the tube 76 are similarly pinched off by die members (only upper pinch off members 94 and 96 are shown in FIG. 6). Above the pinch off members 90 and 92, the die halves 84 and 86 have respective recesses 100 and 102 which squeeze portions of opposite sides of the tube 76 together to form a seam which is the precursor of the solid rib 30. The closed mold halves with the preform 82 therein are moved from the extrusion station, FIG. 5, and to the blowing station, FIG. 6, where a hollow forming die 104 is inserted into the open upper end of the hot preform 82 to form the threaded nipple 68. Gas or air is forced into the hot preform 82 through the hollow forming die 104 to mold the bottle into its final shape. Bottom portions 106 and 108 of the die halves 84 and 86 form the concave portion 24 of the bottle while annular groove sections 107 and 109 behind the respective portions 106 and 108 form the bottom rim 26 of the bottle. Grooves 110 and 112 in the respective die portions 106 and 108 form the hollow ribs 32 and 34 of the bottle.

During the blowing of the preform to the final shape, the hot plastic preform readily stretches or flows to the shape of the cavity formed by the die halves. The largest amount of stretching and plastic flow occurs in the grooves 107 and 109 forming the bottom rim 26. The area of the seam, i.e. areas 40 and 42 where the solid rib 30 joins the bottom rim is thicker and offers more resistance to stretching and plastic flow. The grooves 110 and 112 effectively reduce the depth of the bottom rim forming grooves 107 and 109 relative to the depth of the rim formed at locations spaced from the grooves 110 and 112 to reduce the amount of stretching and plastic flow in the regions 46 and 48. Thus the hollow ribs 32 and 34 result in thicker and stronger wall portions in the bottom rim areas 46 and 48 compared to a bottle formed from similar plastic tube thicknesses with a solid bottom rib and no hollow ribs. This reduces the tendency in bottles formed with a solid bottom rib to bulge in bottom rim regions located ninety degrees from the solid rib to avoid instability or rocking of the bottle in an upright position. The hollow ribs 32 and 34 in combination with the solid rib 30 provide greatly improved reinforcement for the concave bottom portion to enable more economical manufacture of blow molded plastic bottles.

After blow molding, the bottle is removed from the mold and the excess preform material above the nipple 68 and below the pinch off inserts 100 and 102 is trimmed to complete formation of the bottle.

The tube 76 can be a single layer of a suitable plastic material or can be multiple layers of different plastic materials. One particularly suitable extrusion is formed by outer and inner layers of polycarbonate with an intermediate layer of amorphous polyamide; examples of materials forming such multilayer containers are disclosed in U.S. patent application Ser. No. 07/298,390 filed Jan. 18, 1989, and which is incorporated herein by reference. In one example of a bottle made in accordance with the invention, the extrusion 76 is formed from five coaxially extruded layers, from outside to inside—polycarbonate, regrind, amorphous polyamide, regrind and polycarbonate. Regrind includes the trimmed excess preform material.

Since many variations, modifications and changes in detail can be made to the above disclosed embodiment without departing from the scope and spirit of the invention, it is intended that the above disclosure and accompanying drawings be interpreted as illustrative and not in a limiting sense.

What is claimed is:

1. A bottle with a reinforced concave bottom formed from a plastic material, comprising
   a tubular wall having an upper portion and a lower portion,
   a nipple formed on the upper portion to provide for flow of contents into and out of the bottle;
   a bottom including a center concave portion and a bottom rim portion surrounding and extending down from the concave portion;
   a depending solid rib extending across the concave portion and joined at opposite ends of the solid rib to opposite sides of the bottom rim portion; and
   a pair of depending hollow ribs formed in the concave portion on respective opposite sides of the solid rib;
   said hollow ribs extending radially in the concave portion and being joined to the bottom rim so as to produce increased thickness of the plastic material in regions of the bottom rim portion at the junctions with the hollow ribs compared to similar bottom rims portions formed with the same amount of plastic material but without such hollow ribs.

2. A bottle as claimed in claim 1 wherein the hollow ribs are perpendicular to the solid rib.

3. A bottle as claimed in claim 1 wherein the bottle is formed by blow molding.

4. A bottle as claimed in claim 3 wherein the solid rib is formed by a sealed seam of a tubular preform.

5. A bottle as claimed in claim 3 wherein the hollow ribs are formed by displacement into grooves of a mold during blow molding.

6. A bottle as claimed in claim 4 wherein the hollow ribs are formed by displacement into grooves of a mold during blow molding.

* * * * *